US 8,458,469 B2

(12) United States Patent
Berbain et al.

(10) Patent No.: US 8,458,469 B2
(45) Date of Patent: Jun. 4, 2013

(54) SECURE COMMUNICATION BETWEEN AN ELECTRONIC LABEL AND A READER

(75) Inventors: Côme Berbain, Montrouge (FR); Olivier Billet, Tourrettes sur Loup (FR); Henri Gilbert, Bures sur Yvette (FR)

(73) Assignee: France Telecom, Paris (FR)

( * ) Notice: Subject to any disclaimer, the term of this patent is extended or adjusted under 35 U.S.C. 154(b) by 465 days.

(21) Appl. No.: 12/680,188

(22) PCT Filed: Sep. 24, 2008

(86) PCT No.: PCT/FR2008/051704
§ 371 (c)(1),
(2), (4) Date: Mar. 25, 2010

(87) PCT Pub. No.: WO2009/050368
PCT Pub. Date: Apr. 23, 2009

(65) Prior Publication Data
US 2010/0199090 A1    Aug. 5, 2010

(30) Foreign Application Priority Data
Sep. 26, 2007  (FR) ..................................... 07 06745

(51) Int. Cl.
*H04L 9/32* (2006.01)
(52) U.S. Cl.
USPC ............................................ 713/168; 340/5.8

(58) Field of Classification Search
None
See application file for complete search history.

(56) References Cited

U.S. PATENT DOCUMENTS

| 2002/0049904 | A1 | 4/2002 | Nowottnick et al. |
| 2005/0123133 | A1 | 6/2005 | Stewart et al. |
| 2008/0165005 | A1* | 7/2008 | Burbridge et al. ......... 340/572.1 |
| 2008/0297354 | A1* | 12/2008 | Foley et al. ................ 340/572.4 |

OTHER PUBLICATIONS

Ohkubo et al.: "Cryptographic Approach to 'Privacy-Friendly' Tags", RFID Privacy Workshop, Massachusetts Institute of Technology, 2003, pp. 1-9, XP002481180.

* cited by examiner

*Primary Examiner* — Brandon Hoffman
*Assistant Examiner* — Nega Woldemariam
(74) *Attorney, Agent, or Firm* — Knobbe Martens Olson & Bear LLP (57) ABSTRACT

The invention relates to a secure communication between an electronic label (A) and a reader (B), in particular for the authentication of the label by the reader, in which: the reader (31) transmits at least one datum (Ch) to the label, the label calculates a combination comprising at least the datum from the reader (Ch)) and a secret ($S_i$) specific to the label, and the label communicates (32) the result ($C(S_i, Ch)$) of the combination to the reader (B) for verification purposes. The aforementioned combination ($C(S_i, Ch)$) is preferably calculated using a current secret value ($S_i$) delivered by a pseudo-random number generator (33). The reader (B) is also provided with a homologous pseudo-random generator.

13 Claims, 6 Drawing Sheets

SECURE COMMUNICATION BETWEEN AN ELECTRONIC LABEL AND A READER

This application is a 35 U.S.C. §371 National Stage entry of International Application No. PCT/FR2008/051704, filed on Sep. 24, 2008, and claims priority to French Application No. 0706745, filed on Sep. 26, 2007, each of which is hereby incorporated by reference in its entirety as if fully set forth herein.

TECHNICAL FIELD

The present invention relates to ensuring the security of exchanges between an electronic tag and at least one reader of said tag.

STATE OF THE ART

With the widespread and increasing use of electronic tags (for example RFID tags (for "Radio Frequency Identifier")), or more generally contactless cards such as those using coding schemes for example of EPC (Electronic Product Code) type, problems arise relating to the security between tags and readers.

One of the most sensitive problems is the protection of the private life of the bearer of the electronic tag. In fact, the communications between electronic tags and readers of electronic tags can disclose important information on the life of the electronic tag, and thus on the private life of the bearer of these electronic tags. The radio interface of these tags allows surreptitious remote querying and as a result exposes these tags to attacks. Furthermore, the omnipresence of telecommunications networks, and therefore the high connectivity of the readers, and thus the tags, makes this problem even more critical.

Generally, a tag A, authenticating via a reader B, states its identity by communicating a secret $K_A$, known only to the tag A and the reader B. Proof of identity can be carried out in several ways.

In a basic implementation, the tag A simply transmits the secret $K_A$ in clear to the tag B. In this case, an attacker is able to monitor the communication between A and B, retrieve the secret and then impersonate the tag A. There is then total traceability of the communications of the tag A.

Figure 1:
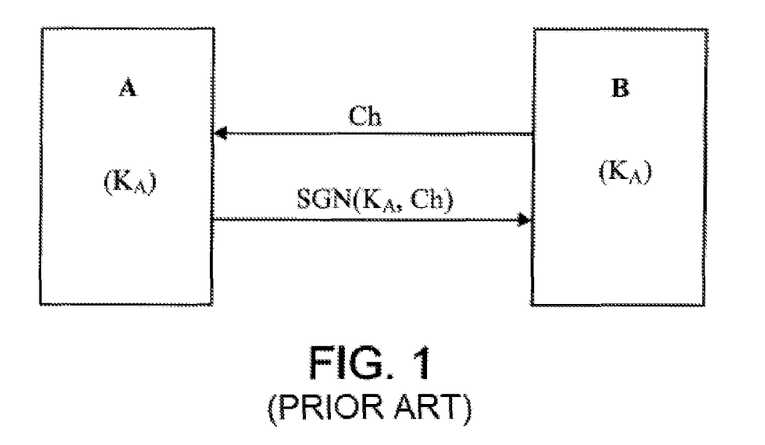
FIG. 1 shows a process in which the reader B first sends a random number to the tag and, on receiving this random variable the tag signs the random variable with a secret key.

In order to overcome this drawback, in a more sophisticated implementation shown in FIG. 1, the reader B first sends a random number Ch (called "random variable" or "challenge") to the tag A. On receiving this random variable Ch, the tag A signs the random variable with a secret key $K_A$ and sends the result of the signature SGN($K_A$, Ch) to the reader B, which verifies the accuracy of the calculation by reproducing it. This is a typical secret key algorithm.

One of the required criteria for an electronic tag is a low production cost. As a result, a tag does not have as many means of protection as a standard chip card in order to prevent its secret $K_A$ being read from memory. Thus, it is generally possible to physically open a tag and consult an internal memory storing a secret $K_A$ specific to the tag. An attacker can therefore fraudulently take possession of such an electronic tag and read there from the secret $K_A$ of the tag.

A possible attack scenario is then as follows. An attacker records the communications between a tag and one or more readers over a period of time and then takes possession of the tag. It is possible for him to determine the secret specific to the tag and then to interpret all the communications that it has been able to record in the past. The attacker can then "retrospectively understand" exchanges previously monitored. The attacker can thus discover, for example, the average hours of communication between the tag and a reader and deduce there from the habitual behaviour of the bearer of the tag.

Therefore, it is desirable for electronic tags to be capable of providing satisfactory security guarantees, in particular for "retrospective un traceability". By "traceability" is meant the ability to monitor and understand data exchanged between an electronic tag and a reader. The term "retrospective" refers to the retrospective ability to understand previous exchanges using hacked secret information.

More generally, traceability is also possible by simply monitoring the response of a tag to a single random variable. In this case, an attacker impersonates a reader and always provides the same random variable to the tag and the latter always provides the same response. The attacker can then detect the tag each time it receives the same response.

In order to overcome these drawbacks associated with the retroactive traceability of an electronic tag, in the document: "Cryptographic Approach to Privacy-Friendly Tags", M. Ohkubo, K. Suzuki and S. Kinoshita, *RFID Privacy Workshop*, MIT (Massachusetts, USA), 2003, the application of at least one hashing function as explained hereafter with reference to FIG. 2 was proposed.

Figure 2:
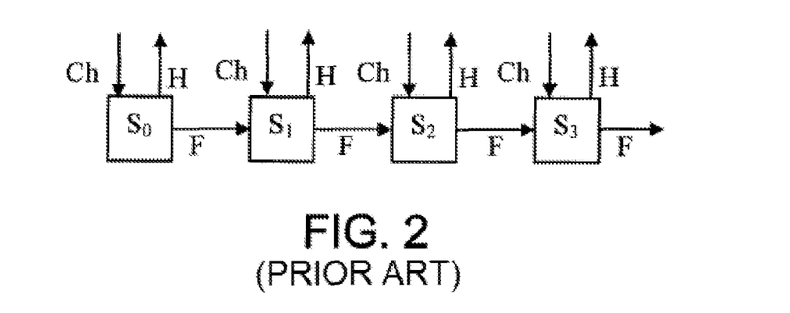
FIG. 2 shows a process employing a hashing function.

In this implementation, the tag A has a memory storing a current value $S_i$, (i=0, 1, 2, 3 in FIG. 2). During a communication with the reader B, the tag calculates a hash code H as a function of the current value $S_i$ and the random variable Ch that is sent to it by the reader B and sends the H result back to the reader. At the same time, the tag A modifies the current $S_i$ value, applying thereto a hashing function F, and stores the result obtained as a new current value $S_{i+1}$. This new current value $S_{i+1}$ will be used for calculating the hash code by the function H during a subsequent communication with a reader. For its part, the reader B comprises similar means for verifying the H result and for updating the current value $S_{i+1}$.

This solution ensures that the value of secret $K_A$ specific to the tag is able to develop ($S_i$, $S_{i+1}$, $S_{i+2}$, etc) at each communication with a reader, the readers themselves being capable of retrieving the current secret value $S_i$ using a one-way function such as a hashing function.

However, this theoretical solution still has drawbacks. Verification by the reader is expensive in computation resources. Typically, the verification complexity for the reader increases linearly with time (with the number of updates). Above all, the calculations to be carried out by the processor of the tag are very costly in terms of resources.

Electronic tags must have a low production cost, involving a severely reduced number of gates and/or transistors, in particular for high-distribution applications and/or as high-consumption products. It is noted for example that access to transport services in France (in the Ile-de-France region in particular) is controlled by an electronic tag. Implementation of the aforementioned document by Ohkubo et al. in tags for such an application would result in significant expense.

Similarly, the use of a homomorphic algorithm involving asymmetrical cryptography (for example within the meaning of the RSA (Rivest Shamir Andleman) algorithm would make it possible to overcome the aforementioned traceability problems but once again, the resources needed for the calculations would be prohibitive. For example, for an RSA-type algorithm to be effective, the secret key already requires 1024-bit storage, whilst a number of bits for computation allowed in a standard electronic tag is of the order of 256 bits at most.

It is therefore apparent that the only techniques of the prior art which would be capable of providing the retrospective untraceability require large computation resources, resulting in particularly high production costs for an electronic tag.

The purpose of the present invention is to improve the situation.

BRIEF DESCRIPTION OF THE INVENTION

To this end there is proposed a method of communication between an electronic tag and a reader, in particular for an authentication of the tag by of the reader, in which:
the reader sends at least one datum to the tag,
the tag calculates a combination at least of the datum from the reader and a secret specific to the tag, and communicates the result of the combination to the reader for verification purposes.

According to the invention, the aforementioned combination is calculated by using a current secret value obtained from a succession of pseudo-random secret values specific to the tag and capable of being determined by the reader, a single current secret value being intended for use a limited number of times by the tag.

Thus, within the meaning of the invention, a secret of the tag can be obtained for example using a number generated by a pseudo-random number generator integrated into the tag. The secret of the tag is therefore developing and regularly updated, for example at each communication between the reader and the tag (in which case the aforementioned limited number of times has a value of one). For its part, the reader can comprise (or simply have access to) a pseudo-random generator operating in a coordinated manner with the pseudo-random generator of the tag (for example at each communication between the reader and the tag) so that the current secret value of the tag is known by the reader, allowing it to verify the aforementioned combination sent to it by the tag.

Moreover, this combination can correspond to a stream cipher of the reader (for example a random variable initially sent by the reader) using a key corresponding to the current secret value of the tag. By implementing the invention, the encryption key is updated by the equivalent of a one-way function, guaranteeing retrospective untraceability. However, this equivalent of a one-way function is not as costly in terms of computation resources as a hashing function within the meaning of the aforementioned document by Ohkubo et al. Typically, the equivalent number of gates (NAND gates or other) required for implementation of the invention with a pseudo-random generator and stream cipher is of the order of 2000 whilst it is of the order of 5000 in the implementation described in the document by Ohkubo et al.

Implementation of the invention in an electronic tag can therefore be carried out simply by wired logic, with limited calculation capacity, as it requires only a very limited number of extremely simple operations.

The invention nevertheless makes it possible to resolve not only the problem of confidentiality during authentication, but also the problem of traceability, and therefore finds applications in almost all of the fields of use for electronic tags.

DESCRIPTION OF THE FIGURES

Further features and advantages of the invention will become apparent on examination of the detailed description hereafter, and of the attached drawings in which, in addition to FIGS. 1 and 2 mentioned above.

DETAILED DESCRIPTION

Figure 3A:
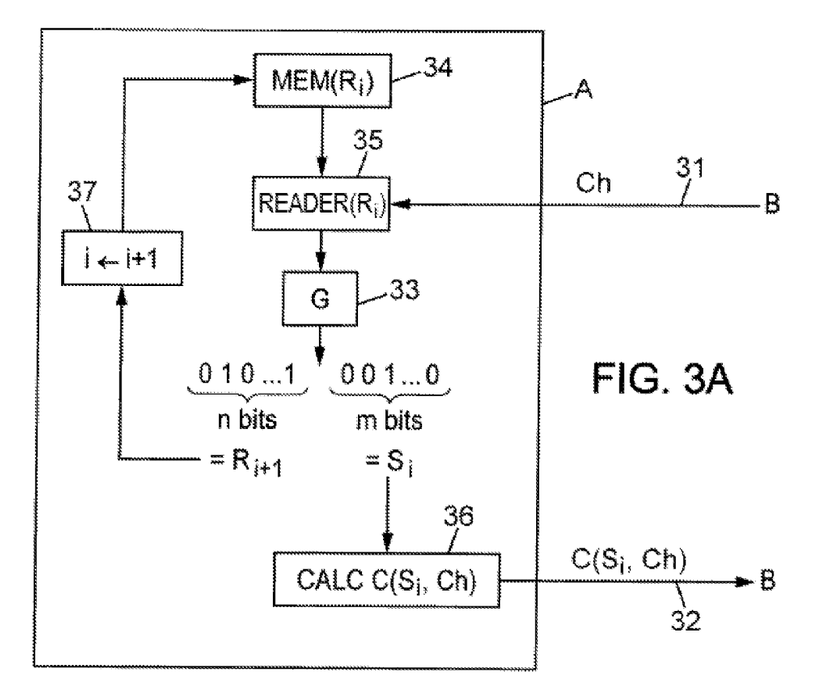
FIG. 3A shows the steps implemented in an electronic tag, in an embodiment of the invention.

Firstly, reference is made to FIG. 3A, representing the operations implemented within the meaning of the invention, by an electronic tag A in order to authenticate itself with a reader B. The tag A typically comprises a wired logic circuit and optionally a working memory and/or storage memory (not shown) which are active when the tag is supplied with electricity. In the example described, the tag is supplied with electricity via an induced current (as in an RFID tag) each time the tag A physically approaches the reader B. Thus, in the example described, the operations carried out by the tag (FIG. 3A in particular) take place each time the tag is supplied with electricity for a communication with the reader which provides its electricity supply.

Figure 7:
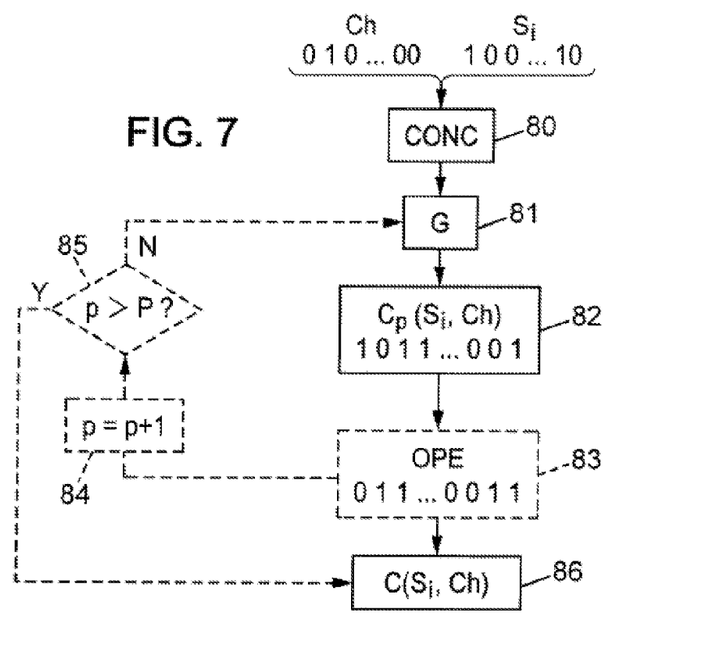
FIG. 7 shows an example of a combination within the meaning of the invention of the secret $S_i$ of the tag and Ch data received from the reader, advantageously implementing a pseudo-random generator G.

In a simple implementation, the basic principle of the communication between the tag A and the reader B in particular for authentication of the tag by the reader can remain substantially the same as that described previously with reference to FIG. 1 of the prior art:
the reader B sends to the tag A (arrow 31 of FIG. 3A) at least one datum corresponding for example to a random variable (or "challenge") Ch, and
the tag responds to the reader (arrow 32 of FIG. 3A) by sending a combination $C(S_i, Ch)$, such as a signature and preferably an encryption which will be described below with reference to FIG. 7, this combination involving at least the random variable Ch and a secret $S_i$ (such as an encryption key) specific to the tag A.

Here it is indicated that the reader B can send other data to the tag A (arrow 31), apart from the random variable Ch, such as an indication, for example, of the date and place of the communication. Similarly, the combination $C(S_i, Ch)$ that the tag sends back (arrow 32) can involve other data that those of the random variable Ch and the secret $S_i$, for example a service identifier associated with the tag or even with the bearer of the tag. Thus, application of the invention is not limited to authentication of the tag, but extends more generally to a communication between the tag and a reader. The aforementioned identifier can have a fixed value, the essential point being that the secret Si specific to the tag, within the meaning of the invention, can develop so that the result of the combination is also variable, for a single random variable Ch and, if appropriate, for a single identifier.

Figure 8A:
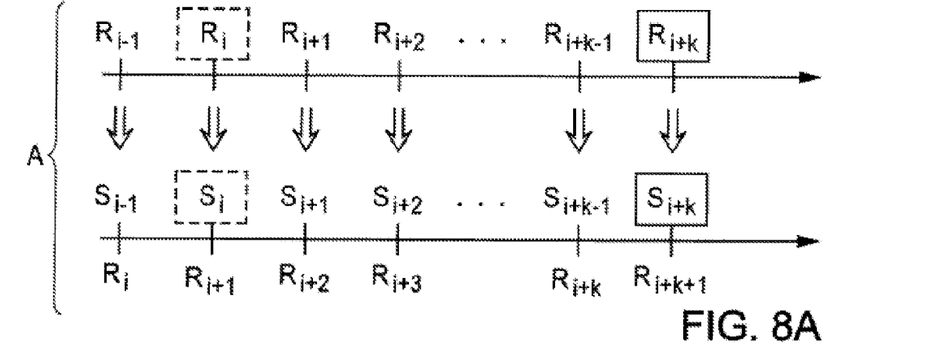
FIGS. 8A and 8B show respectively a succession of pseudo-random values available to a tag A and a succession of pseudo-random values available to a reader B.

With reference to FIG. 8A, the secret specific to the tag A can take a value $S_f$ from a succession of pseudo-random values $S_{i-1}, S_i, S_{i+1}, S_{i+2}, \ldots, S_{i+k-1} S_{i+k}$. It will be understood that the term "succession" refers here to a concept of rank i. In particular, the reader B, for its part, must know the current value of the rank i in order to deduce there from the current value $S_i$ (FIG. 8B) of the secret specific to the tag, with which it proceeds to verify the combination $C(S_i, Ch)$ sent to it by the tag, as will be seen below with reference to FIG. 3B.

As a result, a sequence $S_{i-1}, S_i, \ldots, S_{i+k}$ of pseudo-random secret values must be predefined, for both the electronic tag and the reader.

Here, the term "pseudo-random" refers to the fact that there is a priori no logical link (no function or other) between a value $S_i$ and any other value $S_{i+k}$, or, at least, that if this link exists, it cannot be calculated easily or within a reasonable time period. For example, a possible application of the invention, advantageous in particular in the case of a number of accesses limited to a service, if authentication of the tag gives access to a service, can consist of storing a limited number of secret values $(S_0, S_1, \ldots, S_i, \ldots, S_K)$ without any link between them (for example: 2, 31, 107, 98, 21, etc.) and increasing the rank i of the secret value $S_i$ for example after each communication with the reader. This technique, called the "token" technique, ensures retrospective untraceability if care is taken to delete from the memory of the tag (or "set to zero") each previously-used secret value $S_{i-1}$.

A preferred implementation however consists of using a pseudo-random number generator. By "pseudo-random generator" is here meant a module (reference G in FIG. 3A) comprising an input and an output and capable, in particular, of delivering a single second number $(R_{i+1}, S_i)$ at the output, when a single first number $(R_i)$ has been provided to it at the input. Moreover, no link is detectable a priori between the first number that it receives at the input and the second number that it delivers at the output, for any aforementioned first and second number pair. At least, having the second number delivered at the output does not allow the calculation within a reasonable time of the first number which was injected at the input. Another property of the pseudo-random generator is that, if the aforementioned first and second numbers are encoded in bits, the generator produces q bits at the output if it is provided with p bits at the input, with q greater than or equal to p. These are the only useful properties of the generator G for implementing the invention.

Therefore, with reference to FIG. 3A, the electronic tag A initially stores (step 34), in a memory of the tag or in a memory of the generator G that it comprises, a number $R_i$ having n bits, hereafter called "internal state" of the generator G of the tag. When the tag is brought towards the reader, it is supplied with electricity and, for example on receiving the random variable Ch from the reader, the following procedure is implemented:

the value $R_i$ of the internal state is read in the aforementioned memory (step 35), and this read value $R_i$ is provided at the input of the pseudo-random generator G (step 33), which delivers a set of n+m bits (010 . . . 1001 . . . 0) at the output.

In the example shown in FIG. 3A, the n first bits of this series (010 . . . 1) are reserved in order to form the value of the next internal state $R_{i+1}$ (incrementation of the index i in step 37) which must be stored in memory (step 34) after authentication by the reader, replacing the current value $R_i$ of the internal state. The following m bits (001 . . . 0) define the current secret value $S_i$ which will be used to calculate the combination $C(S_i, Ch)$ (step 36) which is sent to the reader B (arrow 32). Thus, during a next communication with the reader, a value of the internal state $R_{i+1}$ newly stored in memory will be provided to the generator G in order to deliver a new value $S_{i+1}$ of the secret.

In this implementation, a new value $S_i$ of the secret is produced at each communication with the reader. Thus, a secret value is used only once, on the occasion of a communication. However, it is also possible also not to activate the generator G and delivery a new secret value $S_i$ only after a limited number of communications with the reader. In this case, the tag uses a single current value $S_i$ of the secret a limited number of times. This implementation, which can be useful in certain applications, nevertheless requires a communications counter and it is simpler for the generator G to be activated as soon as the tag is supplied with electricity during a communication, as described above.

Moreover, it would be possible, in the n+m bits delivered at the output of the generator G, to reserve n bits ($R_{1+}O$ for the next selection of the generator G, but to use r bits (with r>m) in order to form the value $S_i$ of the secret, by taking additional bits from the n bits forming the internal state $R_{i+1}$. It is also possible, in the case where the numbers of bits at the input and at the output of the generator are equal (m=0), to use the same bits in order to form both the internal state according to $R_{i+1}$ and the current secret value $S_i$. However, as the internal state $R_{i+1}$ is then stored in memory, it would be possible for an attacker, by taking control of the tag and reading the internal state $R_{i+1}$ in the memory, to know the secret value $S_i$ which a allowed the last authentication of the tag, which limits the guarantee of retrospective untraceability (nevertheless to a single previous authentication). In order to overcome this drawback, it can be agreed to carry out two selections (a selection of n bits in order to form $R_{i+i}$ and a selection of n bits in order to form $S_i$) at each authentication.

Moreover, as each value of the internal state $R_i$ at the input of the generator G corresponds to a secret value $S_i$ at the output of the generator, it appears that the internal state $R_i$ represents finally a "code" representing the rank i of the secret value Si, in the aforementioned succession $S_0, S_1, \ldots, S_i, \ldots, S_K$. Thus, the tag comprises a first pseudo-random generator G in order to determine a new current value of the secret $S_{i+1}$, replacing an old $S_i$ value (having a rank i immediately below the rank i+1 of the new value $S_{i+1}$). however, for its part, the reader B must also update the value of the rank i in order to know the secret value which was used by the tag A in order to calculate the combination $C(S_i, Ch)$.

Figure 3B:
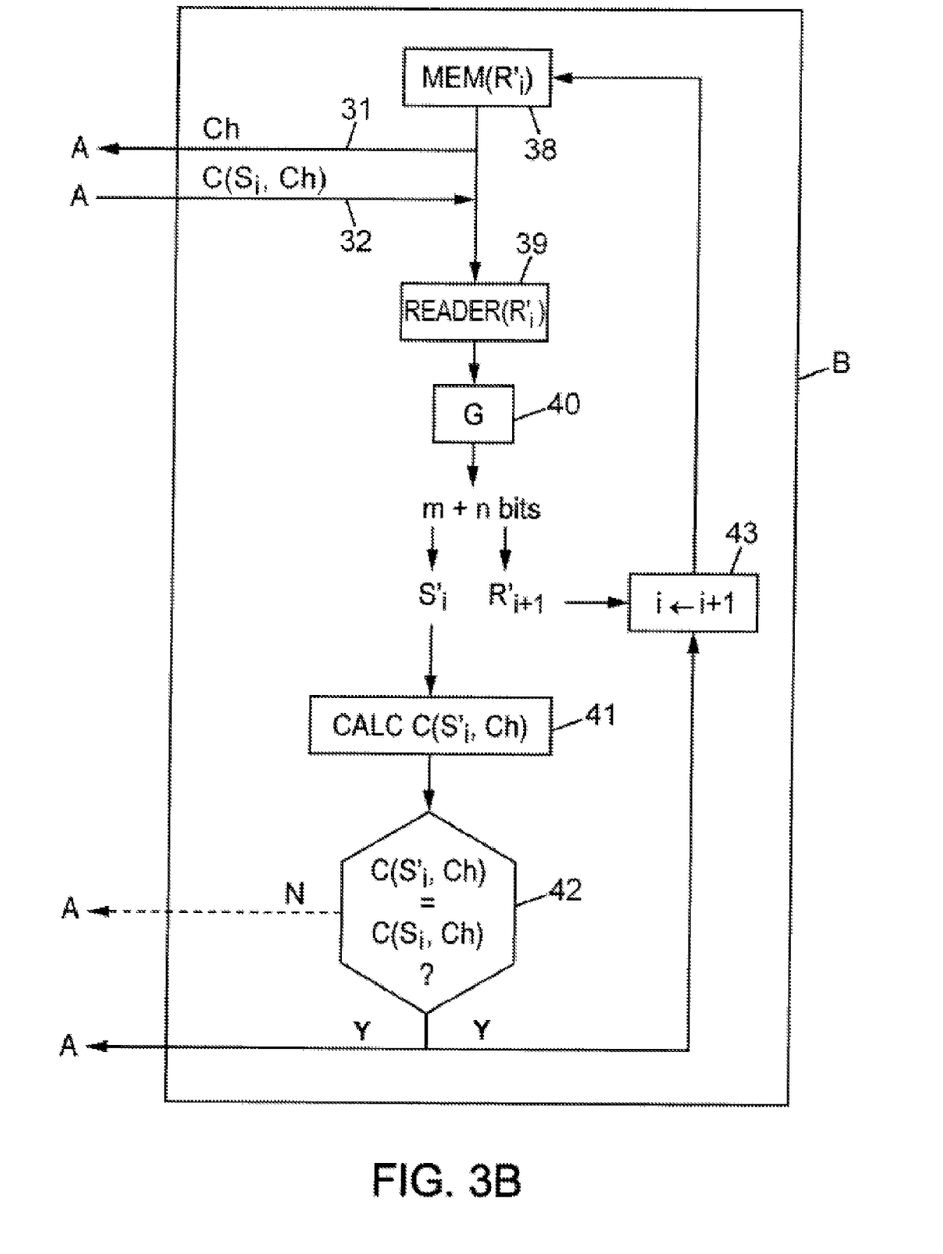
FIG. 3B shows the steps implemented in an electronic tag reader within the meaning of the invention, in an embodiment of the invention where the tag cooperates only with a single reader.

To this end, with reference to FIG. 3B, a further pseudo-random generator G is provided, operating in a coordinated manner with the generator G of the tag, and available to the reader B so that the latter knows the current secret value of the tag.

The two generators in FIG. 3A, on the one hand, and FIG. 3B, on the other hand, are identical in the sense that they deliver the same bits at the output when they have received the same bits at the input.

Referring now to FIG. 3B, the reader B initially stores in memory its specific internal state value $R'_i$ (step 38). After sending the random variable Ch (31) and reception of the response of the tag (32) by the reader B, the value of the internal state $R'_i$ is read (step 39) in order to be provided to the pseudo-random generator of the reader (step 40). It is here indicated that, the reader B can comprise the generator implemented in step 40, or simply consult it remotely in the case where several readers, for example in a network, share a single pseudo-random generator capable of updating a database accessible to the readers. This implementation is mentioned below with reference to FIG. 5. It will be noted here that the pseudo-random generator involved in step 40 can, generally, be queried by the reader B in order to verify the combination received from the tag A.

The generator of the reader then delivers a succession of bits comprising, in the example shown in FIG. 3B and homologous to the example shown in FIG. 3A:
- n bits corresponding to the next internal state $R'_{i+1}$ which will be stored in the memory of the reader after authentication of the tag,
- and m bits corresponding to the new secret value $S'_i$ with which the reader B recalculates the combination $C(S'_i, Ch)$ (step 41).

The test 42 which follows this step then consists of comparing the two combinations:
- $C(S_i, Ch)$ received from the tag, and
- $C(S'_i, Ch)$ recalculated by the reader B with its secret value $S'_i$.

If the two combinations are different to each other (arrow N at the output of the test 42), the reader B rejects the tag A. Otherwise, if the combinations agree (arrow O at the output of the test 42), the reader B authenticates the tag A and stores in memory (step 38) the new value $R'_{i+1}$ of the internal state (incrementation of the value of the rank i in step 43: "i takes the value of i+1").

It should be noted that care is taken to update the value of the internal state $R'_i$ only if the tag has been authenticated. This measure makes it possible to avoid an attack consisting of causing the internal state $R'_i$ of the reader to update unnecessarily, from a rogue tag, so that the reader will then no longer be able to authenticate a tag despite its validity.

Similarly, in FIG. 3A, (for clarity of the disclosure) an update of the internal state $R_i$ (step 34) is shown after a selection of n+m bits by the pseudo-random generator G. However, it is preferred that the updating 34 is carried out after confirmation of the authentication by the reader (as will be seen in the implementation described below with reference to FIG. 6) as a possible attack could consist of impersonating a reader and simply sending several random variables Ch to a tag in order for it to update its secret value several times, so that the current secret value of the tag would no longer correspond to the one known by the reader.

Figure 8B:
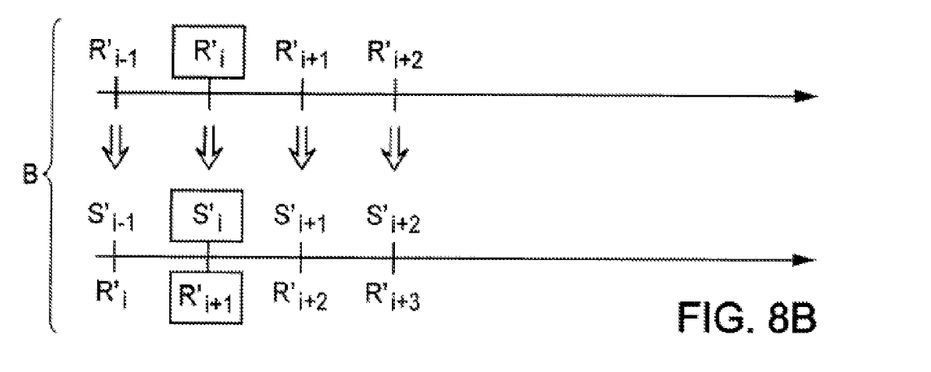

Further, in the embodiment shown in FIG. 3B, it is assumed that the tag interacts only with a single reader B and, vice versa, the reader interacts only with a single tag A, so that their internal state value $R_i$ and $R'_i$ agree (situation shown by boxes with dotted lines in FIG. 8A and solid lines in FIG. 8B). However, a problem arises consisting in that, in a practical implementation, a single electronic tag is normally capable of interacting with several different readers. In this case, the internal state $R_{i+k}$ of the tag (boxes with solid lines in FIG. 8A) can be advanced by a few increments on i with respect to the internal state $R'_i$ (boxes in FIG. 8B) of a reader seeking to authenticate the tag and the reader of FIG. 3B cannot authenticate the tag. This drawback is overcome by the embodiment shown in FIG. 4.

Figure 4:
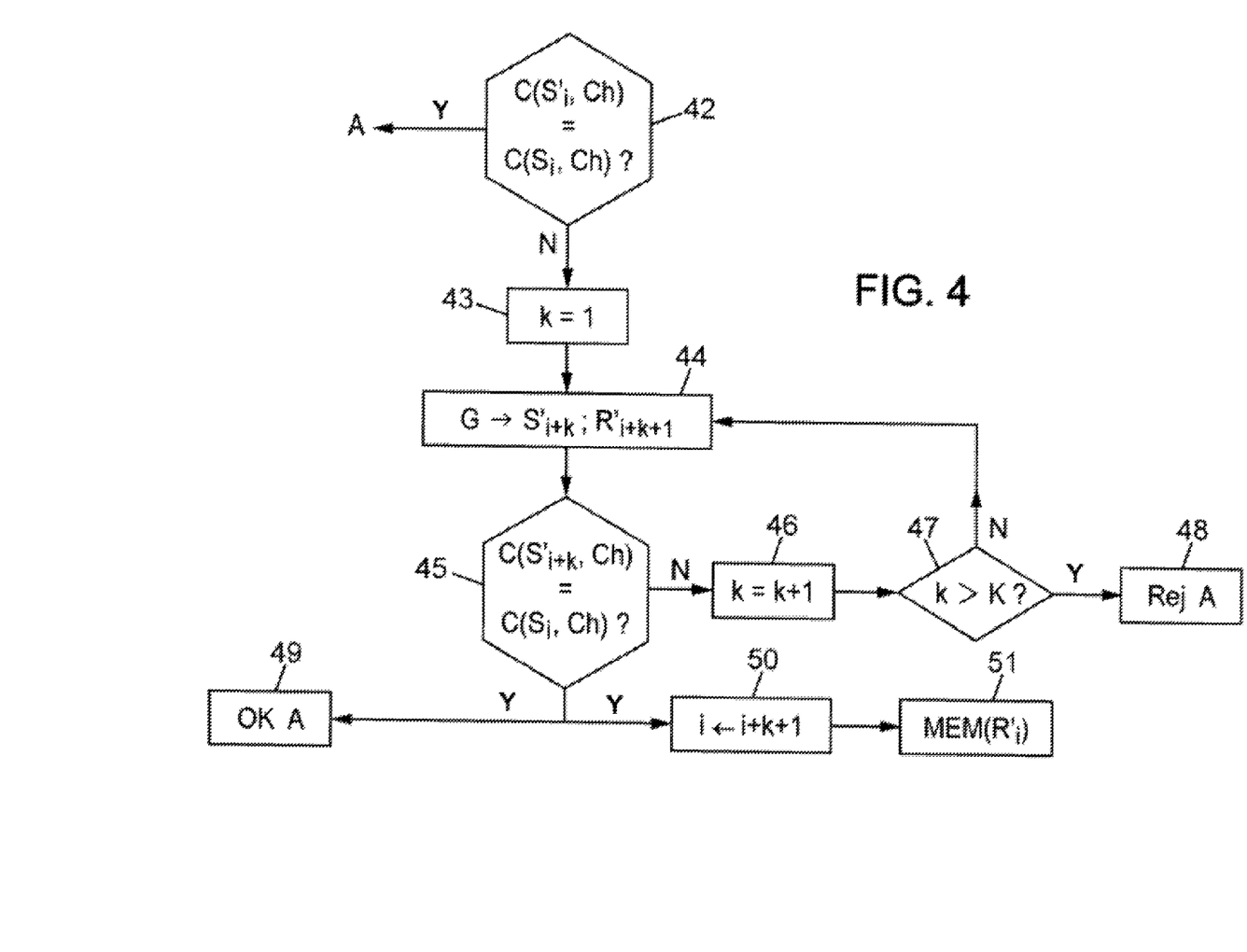
FIG. 4 shows a more sophisticated embodiment than the one shown in FIG. 3B, implemented advantageously in the case where the tag can cooperate with several readers.

In the embodiment of FIG. 4, starting from the test 42 in FIG. 3B, the tag is not immediately rejected if the test of the agreement of the combinations received and recalculated by the reader is negative (arrow N at the output of the test 42). In fact, a finite number K (test 47) of updates of the internal state $R'_i$ and of the secret value $S'_i$ (step 44) are allowed. At each update (loop on the incremented index k (step 46) until reaching, at most, the finite number K) the agreement is verified between the combination $C(S_1, Ch)$ received and the combination recalculated with the updated secret value $S'_{i+k}$ (step 45). If one of the updates effectively leads to an agreement between the combinations (arrows O at the output of test 45), the reader validates the authentication of the tag (step 49) and stores in memory the current value $R'_{i+k+1}$ of the internal state (step 51, the index i taking the value of i+k+1 in step 50), for a next authentication of the card. This current value of the internal state is therefore that generated by the selection of the generator which gave the satisfactory secret value $S'_{i+k}$ for the authentication in test 45. On the other hand, if the value of the finite number K was reached by the loop index k without it having found a secret value $S'_{i+k}$ satisfying the test 45 (arrow O at the output of the test 47), the tag is definitively rejected (step 48).

It should be noted here that the instructions "i takes the value of i+1" (steps 37 and 43) or "i takes the value of i+k+1" (step 50) are shown in the figures for the purposes of explanation only. They are not provided in practice. In fact, generally, it is sufficient to store in memory the last internal state value given by the generator $R_i$ or $R'_i$ and then to inject this value at the input of the generator in order to obtain a new secret value $S_i$ or $S'_i$.

Moreover, a single reader B can serve to authenticate a plurality of tags A, A', A". For example, it is possible to:
- attribute a different initial internal state value $R_0$ for each tag,
- provide these values $R_0^A$, $R_0^{A'}$, $R_0^{A''}$ to the reader, and
- equip the tags and the reader with a single pseudo-random generator G, such that the reader, updating for example a database of the current internal states $R_i^A$, $R_i^{A'}$, $R_i^{A''}$ of the tags, can monitor the authenticity of each tag by testing all the current secret values $S'^A_i$, $S'^{A'}_i$, $S'^{A''}_i$. However, it appears, in the case where several tags A, A', A" can communicate with several readers B, B', B", that the verifications to be carried out with several tags and, for each tag, with K possible secret values (embodiment of FIG. 4), the verification operations that the readers must carry out are demanding and numerous and can delay the interaction with a tag.

Figure 5:
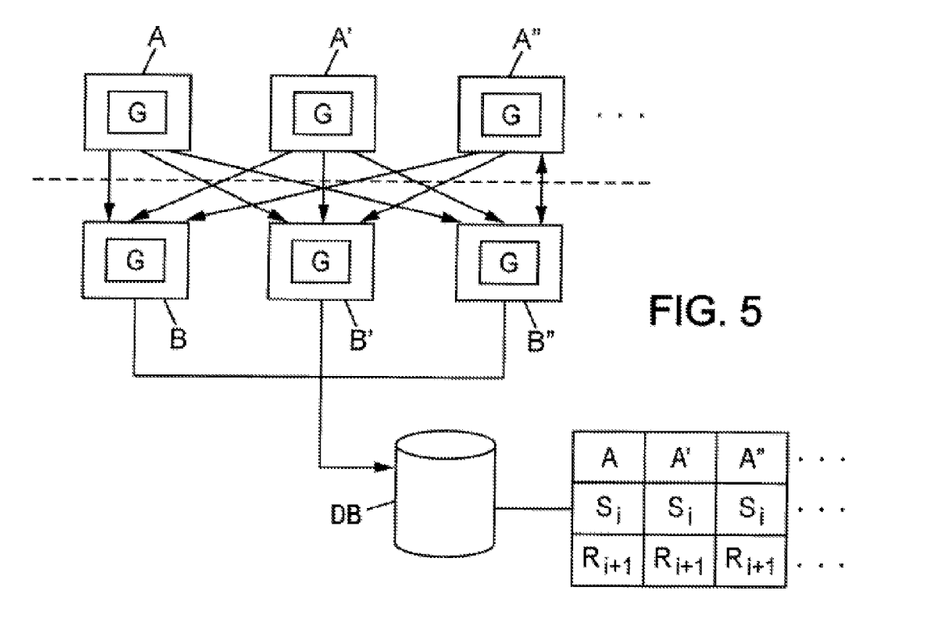
FIG. 5 shows an advantageous management of a plurality of electronic tags capable of cooperating with a plurality of tag readers.

In order to overcome this drawback, with reference to FIG. 5, it is proposed to link the readers B, B', B" to a common database DB which collects and stores the updates performed by each reader and, thus, each reader can consulter this database DB in order to simply deduce and test the last current secret value $S_i$ of each tag A, A', A" for an authentication, and not subsequent secret values $S_{i+k}$ such as described previously with reference to FIG. 4. In this embodiment, at each authentication of a tag carried out by a reader, an incrementation of the internal state and the secret value of this tag is performed by the generator G of this reader, and the new internal state value $R_{i+1}$ and/or the secret value $S_i$ are stored in the database DB for subsequent authentication by the same reader or a different reader which has access to the database DB. It should be noted here that a single tag is not required to communicate with two different readers or more, at the same time.

It is possible, in certain applications (small number of readers in a local network for example for secure access to a building) to provide only a single networked generator G, that can consult the readers B, B', B", this generator being linked moreover to the database DB, since all the generators of the readers B, B', B" in FIG. 5 are identical. However, if several tags communicate with several respective readers at the same time, the processing time of this single generator and its consultations/archivings of the database can significantly disturb the communications between readers and tags. Thus, it can therefore be advantageous for each reader to incorporate its own generator G. It can even be advantageous for each reader to store in memory a same database DB, the databases being identical from one reader to another, and updated by communication from a reader to all the other readers over the network linking them, for example during periods of inactivity in order not to disturb the interactions with the tags.

This implementation is advantageous. However, a possible attack could consist of impersonating a reader to a tag in order to unnecessarily increment its internal state, so that the internal state of the tag $R_{i+1}$ no longer corresponds to that of $R_i$ stored in the database DB. Again a procedure can be provided intended to authorize the reader to carry out a finite number K of tests of subsequent secret values $S_i, \ldots, S_{i+K}$ as described previously with reference to FIG. 4, but then again there is the drawback of demanding processing to be carried out by the readers.

Figure 6:
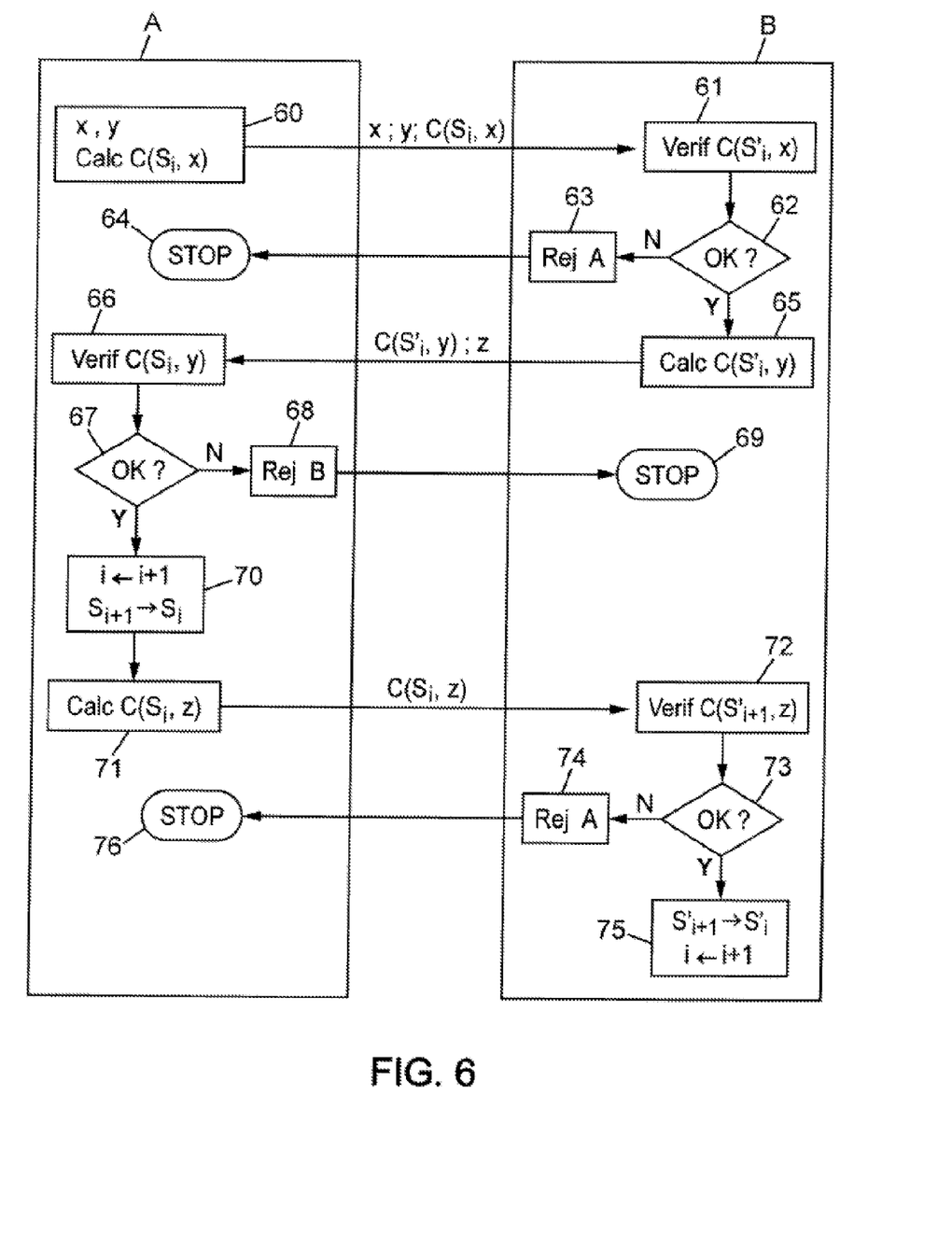
FIG. 6 shows an example of an advantageous communications protocol for a tag authentication implementing the invention.

The implementation shown in FIG. 6 will overcome this drawback. It has the feature of leaving to the tag A the initiative of sending the random variable Ch to the reader. More precisely, with reference to FIG. 6:

the tag A sends (step 60) to the reader B a first datum (random variable x) and a second datum (random variable y) of the tag, as well as a first combination $C(S_i, x)$ calculated using the first datum (x) and a current secret value $S_i$ of the tag A, the reader B recalculates the first combination (step 61) using the first datum x received from the tag and a current secret value $S'_i$ of the reader.

If the reader does not manage to establish the correspondence between the first combination $C(S_i, x)$ received from the tag and the one that it recalculates $C(S'_i, x)$ (arrow N at the output of the test 62), then the tag is not valid (step 63) and the communication stops (step 64).

On the other hand, in case of identity with the first combination received from the tag (arrow O at the output of the test 62), the reader sends to the tag:

a second combination $C(S_i, y)$ calculated (step 65) using the second datum (y) received from the tag and the current secret value $S'_i$ of the reader, as well as a third datum (random variable z) of the reader.

Then, the tag A recalculates (step 66) the second combination using the second datum (y) of the tag and the current secret value $S_i$ of the tag. If the tag is not able to establish the correspondence between the second combination $C(S_i, y)$ received from the reader and the one that it recalculates $C(S'_i, y)$ (arrow N at the output of the test 67), then the reader is an attacker (step 68) and the communication stops (step 69). On the other hand, in case of identity with the second combination received from the reader (arrow O at the output of the test 67), the tag:

replaces its current secret value $S_i$ by a new value $S_{i+1}$, for example by incrementing its internal state (step 70), and sends to the reader a third combination $C(S_{i+1}, z)$ (but marked $C(S_i, z)$ in FIG. 6, due to the incrementation i=i+1), calculated using the third datum (random variable z) received from the reader and the new current secret value $S_{i+1}$ of the tag (step 71).

For its part, the reader B:

determines a new secret value $S'_{i+1}$ (but does not yet store its internal state $R'_{i+2}$), recalculates the third combination (step 72) using the third datum (random variable z) of the reader and the new determined secret value $S'_{i+1}$ of the reader.

If the reader does not manage to establish the correspondence between the third combination $C(S_{i+1}, z)$ received from the tag and the one that it recalculates $C(S'_{i+1}, z)$ (arrow N at the output of the test 73), then the tag is not valid (step 74) and the communication stops (step 76). A hacker of the tag will simply have obtained a single instance of the correct secret value $S_i$. On the other hand, in case of identity with the third combination received from the tag (arrow O at the output of the test 73), the reader definitively replaces its current secret value $S'_i$ by the new secret value $S'_{i+1}$ (step 75), for example by storing in memory the internal state $R'_{i+2}$ which had been obtained with the new secret value $S'_{i+1}$.

Advantageously, as the tag already comprises a pseudo-random generator G, in order to limit the means to be installed in the tag (and therefore limit its production cost), it is advantageous for the first random variable x and the second random variable y given by the tag to be simply obtained by selection by the pseudo-random generator G of the tag. To this end, a developing datum of any kind can be provided at the input to the generator (a timestamp for example or even the current internal state $R_i$, by reinjecting the result of the selection several times at the input of the generator and of course without storing the result obtained as being a new internal state $R_{i+k}$) in order to retrieve two random variables x and y, the overall size of which can be n+m bits. Similarly, the generator of the reader can provide the third random variable z.

More generally, in order to limit the production costs even further, a single pseudo-random generator G can serve several functions, in particular also and advantageously, for the calculation of a combination of a random variable with a secret value. As indicated previously, the combination can consist of a floating-point encryption/stream cipher of the datum of the reader Ch, with the current secret value $S_i$, the latter then serving as an encryption key. Thus, it is possible to take advantage of the performances offered by less demanding and more efficient designs in the field of floating-point encryption/stream cipher. An example is shown in FIG. 7, in which a random variable Ch (succession of bits 010 . . . 00) and an encryption key $S_1$ (succession of bits 100 . . . 10) are combined (step 80) with each other, for example by simple concatenation, or also by mixing their bits in a predetermined manner (known to the tag and to the reader). Then, the composition of bits thus obtained is injected at the input of the generator (step 81) in order to deliver a first combination $C_p(S_i, Ch)$ (step 82 where the sequence of bits 1011 . . . 001 is obtained, for example,). It can be decided that this combination $C_p(S_i, Ch)$ constitutes simply the encryption of the random variable Ch by the key $S_i$ (step 86) or further continues the floating-point encryption/stream cipher (steps 83, 84, 85, in dotted lines in FIG. 7), for example, by operating on the bits that the generator delivers, in a predetermined manner (known to the tag and to the reader). For example, in step 83, a shift of bits (rank j+1=j, therefore 1011 . . . 001 becomes 011 . . . 0011) then reinjects the shift obtained in the generator G in order to obtain a new selection. This processing can be reiterated P times (step 84 and 85) in order to finally obtain (step 86) a sequence of bits corresponding to the encryption $C(S_i, Ch)$ of the random variable Ch by the secret $S_i$. It can, for example, be arranged for a random variable Ch to have n-m bits (the secret $S_i$ extending over m bits), so that the operating method of the generator is unchanged (n bits at the input and n+m bits at the output). In addition or as a variant, it can also be provided that the processing carried out in step 80 adjusts the appropriate number of bits (n in the example described) to be injected at the input of the generator. Typically, if a concatenation is effectively implemented in step 80, it is possible to retain only n bits from the resulting n+m bits by suppressing m bits which occupy positions known to the tag and to the reader, and repeating this step of suppression of bits before each injection into the generator.

Moreover, the concatenation operation for carrying out the encryption is described here only by way of example and allows numerous variants. For example, it can be provided to inject only the secret $S_i$ into the generator and to combine the result obtained with the random variable Ch. Possible implementation can then be as follows. If the number of m bits of the secret $S_i$ is greater than the number of bits n at the input of the generator, it can for example be provided:

to suppress the m-n bits to the left of the secret if the value of the first bit of the random variable is 0 and if not, those to the right, inject the remaining n bits into the pseudo-random generator, in order to retrieve n+m bits, from these n+m bits, suppress the m bits to the right of the secret if the value of the second bit of the random variable is 0 and if not, those to the right, inject the remaining n bits into the pseudo-random generator, in order to retrieve n+m bits, from these n+m bits, suppress the m bits to the right of the secret if the value of the third bit of the random variable is 0 and if not, those to the right, and so on until the number of bits of the random variable is exhausted.

Of course, all these processings are also known to the reader so that it can verify the encryption that is sent to it by the tag (and reciprocally for the embodiment in FIG. 6).

It is thus understood that the floating-point encryption/stream cipher involves at least the pseudo-random generator of the tag (and of course that of the reader in the embodiment of FIG. 6), advantageously without any other means of encryption being necessary.

Thus, the invention provides in particular the advantages below.

The identity of a tag A is known only to a reader B (or B', B") and is never revealed during the authentication.

No reader other than the readers linked to (or comprising) the aforementioned database of secrets can recognize the tag A. In other words, apart from these readers B, B', B" (FIG. 5), two tags A and A' are indiscernable by a third party.

Thus, a tag A cannot be recognized by observing its behaviour.

Even in possession of a reader B allowing the tag A to authenticate itself, a third party cannot identifier the authentications passed between the tag A and any reader B, B' or B" whatever.

It is possible to use a very simple pseudo-random generator, which makes it possible to reduce the number of gates necessary for implementation of the invention, by taking advantage of the numerous existing pseudo-random generators and requiring very few gates.

The present invention also relates to an electronic tag comprising, apart from the means of communication with a reader, means for implementing the invention described above (such as for example a pseudo-random generator G). It also relates to a computer program intended to be stored in the memory of such an electronic tag and comprising the instructions for calculating the combination between a datum received from the reader (random variable Ch) and a secret specific to the tag, by making use a limited number of times of a single current secret value $S_i$ obtained from a succession of pseudo-random secret values specific to the tag. For example, FIG. 3A, FIG. 6 (left-hand part) and FIG. 7 can correspond to flowcharts representing an algorithm or variants of an algorithm of this computer program.

The present invention also relates to a reader intended to communicate with at least one electronic tag in particular for authentication of the tag, the reader comprising, apart from the means of communication with the electronic tag, means for the implementation of the invention described above. It also relates to a computer program intended to be stored in the memory of such a reader and comprising instructions for calculating a combination at least of a datum known to the reader (random variable Ch) and a secret specific to the tag, by making use a limited number of times of a single current secret value $S_i$ obtained from a succession of pseudo-random secret values specific to the tag. For example, FIG. 3B, FIG. 4, FIG. 6 (right-hand part) and FIG. 7 can correspond to flowcharts representing an algorithm or variants of an algorithm of this computer program.

Finally, the present invention also relates to a system comprising at least one tag of the above-mentioned type and at least one reader of the above-mentioned type, for implementing the method within the meaning of the invention. For example, FIG. 5 described above can illustrate such a system.

The invention claimed is:

1. A method of communication between an electronic tag and a reader, for an authentication of the tag by the reader, in which:

a) the reader sends at least one datum to the tag, b) the tag calculates a combination of at least the datum of the reader and a secret specific to the tag, and communicates the result of the combination to the reader for verification of the authenticity of the tag by the reader, wherein said combination is calculated by using a current secret value obtained from a succession of pseudo-random secret values specific to the tag and capable of being determined by the reader, a single current secret value being intended to be used by the tag a limited number of times, wherein a first pseudo-random generator is provided in the tag in order to determine a new current secret value, replacing an old value immediately preceding the new value in said succession, wherein a second pseudo-random generator is provided in order to operate in a coordinated manner with the first generator and is capable of being queried by the reader in order to know a current secret value of the tag, and wherein the first and the second pseudo-random generators are able to receive at the input a first number in order to deliver at the output a second number, and the first and the second pseudo-random generators deliver, in operation, from a first number at the input:

a second number comprising a first secret value in order to calculate said combination, and a third number intended to be stored in the memory of the tag and respectively of the reader in order to be supplied, as the first number, at the input of the first and respectively of the second generator, for a following operation, in order to obtain a second secret value which immediately follows the first secret value in said succession.

2. The method according to claim 1, wherein a new current secret value is determined at each communication between the tag and the reader, and said limited number of times is one.

3. The method according to claim 2, wherein the tag is arranged for communicating with a plurality of readers linked to a database, and wherein:

the second generator is arranged for communicating to said database a new current secret value specific to said tag and/or an indicator of rank of the current secret value in the succession, for storage of an update in the database, and each reader is arranged for consulting said database in order to deduce the current secret value specific to said tag.

4. The method according to claim 1, wherein said combination comprises a floating-point encryption/stream cipher of the datum of the reader, with the current secret value as an encryption key.

5. The method according to claim 4, wherein the first generator is used to carry out said encryption.

6. The method according to claim 5, wherein the encryption comprises at least one application with the first generator of a composition formed by the datum of the reader and the current secret value.

7. The method according to claim 1, wherein:
the tag sends to the reader a first and a second datum of the tag, as well as a first combination calculated using the first datum and a current secret value of the tag,
the reader recalculates the first combination using the first datum received from the tag and a current secret value of the reader, and, in case of identity with the first combination received from the tag, sends to the tag:
a second combination calculated using the second datum received from the tag and the current secret value of the reader,
as well as a third datum of the reader,
the tag recalculates the second combination using the second datum of the tag and the current secret value of the tag, and, in case of identity with the second combination received from the reader:
replaces its current secret value by a new pseudo-random value immediately following the current value in said succession, and
sends to the reader a third combination calculated using the third datum received from the reader and the new current secret value of the tag,
the reader:
determines a new secret value corresponding to a pseudo-random value which immediately follows the current secret value of the reader in said succession,
recalculates the third combination using the third datum of the reader and the new determined secret value of the reader, and, in the case of identity with the third combination received from the tag, replaces the current secret value of the reader by the new determined secret value.

8. The method according to claim 7, wherein the first and second datum, at least, are random variables, and in that the first and second data are obtained using the first pseudo-random generator.

9. An electronic tag, intended to communicate with at least one reader in particular for authentication of the tag by the reader, the electronic tag comprising:
means of communication with the at least one reader,
means of obtaining a secret specific to the tag, and
means of combining at least the secret specific to the tag and data communicated by the reader, a result of the combination being intended to be communicated to the reader for verifying the authenticity of the tag by the reader,
wherein the means of obtaining the secret specific to the tag are arranged for obtaining a succession of pseudo-random secret values specific to the tag, each value being capable of being determined by the reader,
and means of combination are arranged for using each secret value a limited number of times,
wherein a first pseudo-random generator is provided in the tag in order to determine a new current secret value, replacing an old value immediately preceding the new value in said succession,
wherein a second pseudo-random generator is provided in order to operate in a coordinated manner with the first generator and is capable of being queried by the reader to know the current secret value of the tag, and
wherein the first and the second pseudo-random generators are able to receive at the input a first number in order to deliver at the output a second number, and the first and the second pseudo-random generators deliver, in operation, from a first number at the input:
a second number comprising a first secret value in order to calculate said combination, and
a third number intended to be stored in the memory of the tag and respectively of the reader in order to be supplied, as a first number, at the input of the first and respectively of the second generator, for a following operation, in order to obtain a second secret value which immediately follows the first secret value in said succession.

10. A computer program intended to be stored in the memory of a electronic tag intended to communicate with at least one reader for authentication, wherein it comprises instructions for calculating a combination of at least a datum received from the reader and a secret specific to the tag and capable of being determined by the reader, by using a current secret value obtained from a succession of pseudo-random secret values specific to the tag, a single current secret value being intended for use by the tag a limited number of times,
wherein a first pseudo-random generator is provided in the tag in order to determine a new current secret value, replacing an old value immediately preceding the new value in said succession,
wherein a second pseudo-random generator is provided in order to operate in a coordinated manner with the first generator and is capable of being queried by the reader in order to know a current secret value of the tag, and
wherein the first and the second pseudo-random generators are able to receive at the input a first number in order to deliver at the output a second number, and the first and the second pseudo-random generators deliver, in operation, from a first number at the input:
a second number comprising a first secret value in order to calculate said combination, and
a third number intended to be stored in the memory of the tag and respectively of the reader in order to be supplied, as the first number, at the input of the first and respectively of the second generator, for a following operation, in order to obtain a second secret value which immediately follows the first secret value in said succession.

11. A reader intended to communicate with at least one electronic tag in particular for authentication of the tag by the reader, the reader comprising:
means of communication with the at least one electronic tag,
means of obtaining a secret specific to the tag, and
means of combining at least the secret specific to the tag and data sent to the tag by the reader, in order to verify a result received from the tag of a combination of at least the secret specific to the tag and the data sent to the tag by the reader,
wherein the means of obtaining the secret are arranged for obtaining a succession of pseudo-random secret values specific to the tag, and the means of combination are arranged for using each secret value a limited number of times,
wherein a first pseudo-random generator is provided in the tag in order to determine a new current secret value, replacing an old value immediately preceding the new value in said succession, wherein a second pseudo-random generator is provided in order to operate in a coordinated manner with the first generator and is capable of being queried by the reader in order to know a current secret value of the tag, and wherein the first and the second pseudo-random generators are able to receive at the input a first number in order to deliver at the output a second number, and the first and the second pseudo-random generators deliver, in operation, from a first number at the input:

a second number comprising a first secret value in order to calculate said combination, and a third number intended to be stored in the memory of the tag and respectively of the reader in order to be supplied, as the first number, at the input of the first and respectively of the second generator, for a following operation, in order to obtain a second secret value which immediately follows the first secret value in said succession.

12. A computer program intended to be stored in the memory of a reader intended to communicate with an electronic tag in particular for an authentication of the tag, wherein it comprises instructions for calculating a combination at least between a datum known to the reader and a secret specific to the tag, by using a single current secret value, obtained from a succession of pseudo-random secret values specific to the tag, a same secret value being intended to be used a limited number of times by the tag as a current secret value, wherein a first pseudo-random generator is provided in the tag in order to determine a new current secret value, replacing an old value immediately preceding the new value in said succession, wherein a second pseudo-random generator is provided in order to operate in a coordinated manner with the first generator and is capable of being queried by the reader in order to know a current secret value of the tag, and wherein the first and the second pseudo-random generators are able to receive at the input a first number in order to deliver at the output a second number, and the first and the second pseudo-random generators deliver, in operation, from a first number at the input:

a second number comprising a first secret value in order to calculate said combination, and a third number intended to be stored in the memory of the tag and respectively of the reader in order to be supplied, as the first number, at the input of the first and respectively of the second generator, for a following operation, in order to obtain a second secret value which immediately follows the first secret value in said succession.

13. A system comprising at least one tag according to claim 9 and at least one reader according to claim 11.

* * * * *